United States Patent [19]

Herrington et al.

[11] 4,435,780
[45] Mar. 6, 1984

[54] SEPARATE STACK AREAS FOR PLURAL PROCESSES

[75] Inventors: Kenneth M. Herrington; Kenneth L. Jeffries, both of Austin, Tex.

[73] Assignee: International Business Machines Corporation, Armonk, N.Y.

[21] Appl. No.: 274,114

[22] Filed: Jun. 16, 1981

[51] Int. Cl.³ .............................................. G06F 1/00
[52] U.S. Cl. ................................................... 364/900
[58] Field of Search ............... 364/300, 200 MS File, 364/900 MS File, 900

[56] References Cited

U.S. PATENT DOCUMENTS 3,618,045 11/1971 Campbell et al. ................... 364/200
3,665,487 5/1972 Campbell et al. ................... 364/200

*Primary Examiner*—Raulfe B. Zache
*Attorney, Agent, or Firm*—Andrea P. Bryant

[57] ABSTRACT

Multiple processes in an interrupt driven system are efficiently executed because each process has its own independently identified and addressable stack storage area including a process control block. Each process control block includes a link field for forming a distributed list of processes in dispatching priority order.

6 Claims, 11 Drawing Figures

SEPARATE STACK AREAS FOR PLURAL PROCESSES

DESCRIPTION

1. Technical Field

This invention relates to managing process execution in a multiple process system. More particularly, it relates to more efficient interrupt handling and process dispatching in an interrupt driven environment effected by a particular storage allocation technique which provides a one-to-one relationship between processes and storage stacks. Each stack includes a process control block, one portion of which contains a pointer to the next process in a priority ordered chain of processes.

2. Background Art

The present invention is useful in both data and text or word processing. The invention will, however, be described as embodied in a processor based word processing system. To that end, this description will be predicated on a word processing background. Those skilled in the art will, of course, appreciate the parallels between storage management techniques in large and small systems.

A typical interactive text processing system currently operational in many office environments comprises a keyboard, a display, a printer, a diskette storage device, and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which will appear in the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the processor so that these will be transferred by the microprocessor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and is generally stored on the diskette. The name of the document and the diskette number is also added to the index of document kept by the system. This permits the document record to be subsequently retrieved.

After the printed document has been edited by the author, the operator recalls the document from diskette storage into main memory and causes it to be displayed by the system, which is placed in an update mode. The operator may then position the cursor by operation of cursor move keys to a character position on the display which is to be modified, e.g., to a word to be deleted. The operator merely presses a delete key while moving the cursor through the characters of the word by the cursor control key, and the word is erased in storage by action of the microprocessor and will, therefore, not appear in the updated document.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words, automatically replacing a defined word with another word at every occurrence in the document, and moving a word from one position on the line to a different position.

At a more detailed level, the software used by and with the microprocessor in a system such as that above described is functionally divided into, inter alia, many operator selectable applications or tasks. Examples of such applications include text entry, text revision, spelling verification, and background printing. Each of these applications selected, for example, by a single keystorke to so indicate a menu choice, causes a great amount of activity in the microprocessor based system, all of which is transparent to the operator. That activity is initiated and performed by one or, most likely, many processes. A process is the dispatchable entity in the system where the present invention is used. A process is a functional unit consisting of a stack area, a set of programs, and a process control block. Many programs or routines may operate under a single process.

Associated with each process are certain attributes which include process ID, stack size and dispatching priority, etc. Other information associated with a loaded process includes flags, pointers, instruction addresses and current status. Whenever a process is interrupted, this information must be preserved for the resumption of execution of that process.

In some systems a stack, or push down storage area is allocated in RAM. One hardware register holds the beginning address of the stack. Another register, called a stack pointer, contains an off-set into the stack area. Whenever the microprocessor is interrupted by an external event or software control interrupt, it saves it own status and the address of the next instruction to have been executed in the stack at the location pointed to by the stack pointer. The stack pointer is then decremented so that the next interrupt will not overlay this information. Execution of a predefined sequence of instructions associated with the interrupt proceeds. When that sequence is completed, the processor is instructed by software means to restore the status and address of the instruction sequence, increment the status pointer and resume the execution of the first interrupted sequence. A single stack system is difficult to implement unless there are very loose time and space constraints, because each process is subject to various levels of interrupts. Various priorities are associated with the various interrupt levels so that a single process may be interrupted once while a higher priority process executes, which process, in turn, may be interrupted by still another higher priority interrupt. Obviously, a single stack area would, of necessity, require a great deal of storage space because of the unknown number of interrupts and, therefore, occurrences of execution status saving.

A further difficulty in a single stack system concerns the time required for the dispatcher, which controls which process has access to the microprocessor, having the time to examine this unwieldy stack area to determine exactly which process is in which state. One solution to this problem has been to maintain a separate table which includes an entry for each process. Each entry includes, inter alia, process status and location. However, this expedient takes up even more storage space.

The present invention overcomes the disadvantages associated with a single stack environment in a multiprocess interrupt driven environment by allocating a discrete stack area in random access memory (RAM) for each of a finite number of processes. Each stack has, at its beginning, a process control block which contains, inter alia, the process identifier (ID), the total stack size, a register save area, a status field, and a link field. When an interrupt occurs, only the status for that particular process need be saved. If the next executing process is also interrupted, it too need have only its own status information saved. This is an obvious saving of storage space.

Further, the present invention has the advantage of eliminating a separate ready list. That is, the link field in each process control block is used to establish a priority ordered chain of processes ready to execute. Another advantage proceeds from this chaining technique in that only the link field contents need be changed when execution order is to be altered.

A preferred embodiment of our invention will be described having reference to the accompanying drawings, wherein the same reference numerals are used throughout to denote the same items.

DESCRIPTION OF THE INVENTION

Figure 1:
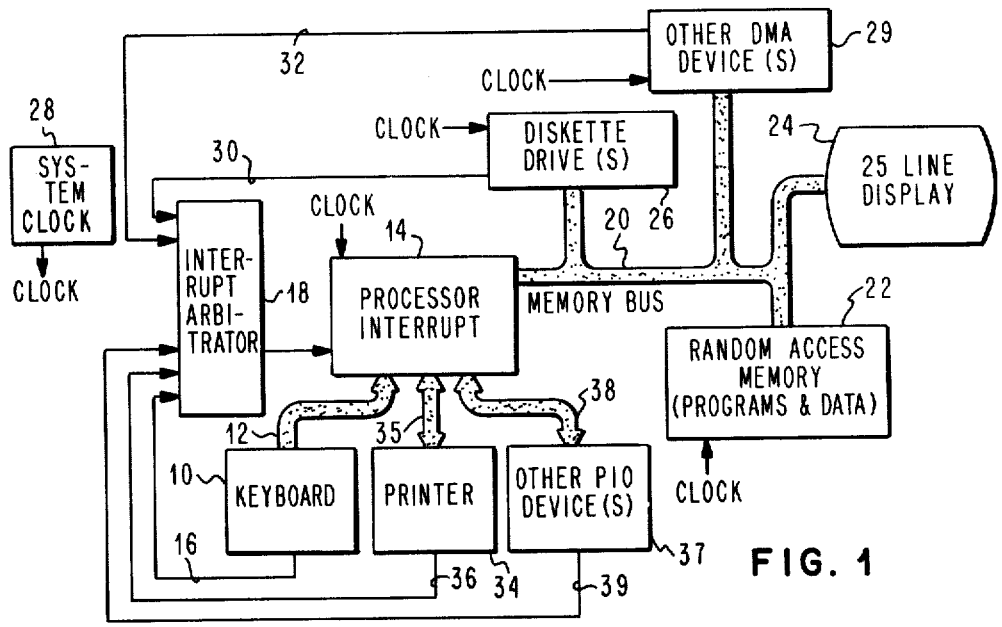
FIG. 1 is a block diagram of a word processing system utilizing the present invention.

The invention will now be described as embodied in an interactive text processing system of the type shown in FIG. 1. Referring to FIG. 1, a block diagram of a word processing system implementing the present invention is illustrated. A keyboard 10 is provided for inputting graphic characters, data and instructions to the word processing system. The graphic characters, data and instructions from the keyboard 10 are applied through a data bus 12 to an electronic digital signal processor 14 of the system. Processor 14 may be implemented by a commercially available microprocessor, such as the Intel Corporations' 8086 processor. The Intel 8086 processor executes on one level with one set of registers.

The keyboard 10 also applies a hardware interrupt signal via interrupt line 16 to an interrupt arbitrator 18. The 8259-A Interrupt Controller was selected to implement the interrupt arbitrator 18 to resolve interrupt requests from the incoming interrupt lines. The 8259-A Interrupt Controller may resolve interrupt requests from up to eight interrupt lines into eight priority levels for the 8086 processor 14. While the interrupt arbitrator 18 illustrated in FIG. 1 receives only five hardward interrupt signals, the word processing system may include additional hardware interrupts. The 8259-A Interrupt Controller may accommodate interrupt lines for up to eight hardware levels, each hardware interrupt having assigned to it a priority code. Interrupt Service Processes (ISP) correspond to each of the hardware interrupts and are dispatched by the system to service that interrupt. While the ISP is running or ready interrupts at the same or lower priority level are masked out thus ensuring proper scheduling of the processor 14 for interrupt servicing.

The processor 14 forms the various control functions necessary for the word processing system to process, edit and display data. The processor 14 is connected by a memory bus 20 to a random access memory 22 for storing system data and programs. A visual display 24 is also connected by the memory bus 20 to the processor 14 for displaying data and information for enabling communication between the system and an operator of the system. A diskette drive 26 driven by the system clock 28 is also connected through the memory bus 20 to the processor 14. The diskette drive 26 comprises means for accessing the system programs. System programs are contained in program libraries on diskettes. Modules from the program library may be loaded into or deleted from RAM. The word processing system may include other direct memory access (DMA) devices 29 connected via the memory bus 20 to the processor 14. The diskette drives 26 and other DMA devices 29 provide hardware interrupt signals on interrupt lines 30 and 32, respectively, to the input arbitrator 18.

A printer 34 communicates via an output data bus 35 with the processor 14 for providing a printed record of keyboard entered data or instructions from the system. The printer 34 provides another hardware interrupt signal via interrupt signal line 36 to the input arbitrator 18. Other processor input/output devices 37 may also be provided as part of the system. The processor input/output devices 37 may communicate via an output data bus 38 to the process 14 and provide a hardware interrupt signal via interrupt signal line 39 to the interrupt arbritrator 18.

Figure 2:
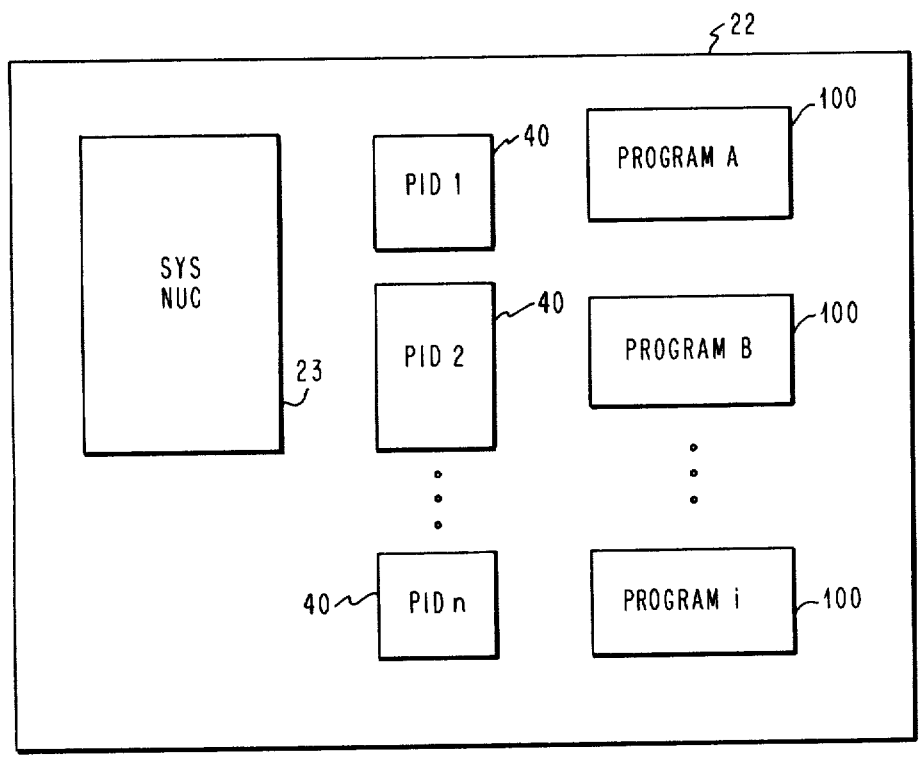
FIG. 2 is a schematic snapshot of memory 22 of FIG. 1.

FIG. 2 is a schematic snapshot of RAM 22 of the system shown in FIG. 1. The snapshot illustrates memory contents when the present invention is in operation. The system nucleus is indicated generally at 23. The system nucleus creates an environment in which processes can be managed and run. A series of processes having IDs PID1 down to PIDn are indicated generally at 40. A plurality of programs associated with various processes are indicated at 100. The system nucleus 23 functions to control interprocess communication, interprocess synchronization, and process serialization. A detailed discussion of these functions is not necessary for a complete understanding of the present invention. The system nucleus functions as related particularly to the dispatching of processes in accordance with the present invention will be discussed further below as the description continues and in particular having reference to FIG. 10.

Figures 3, 4:
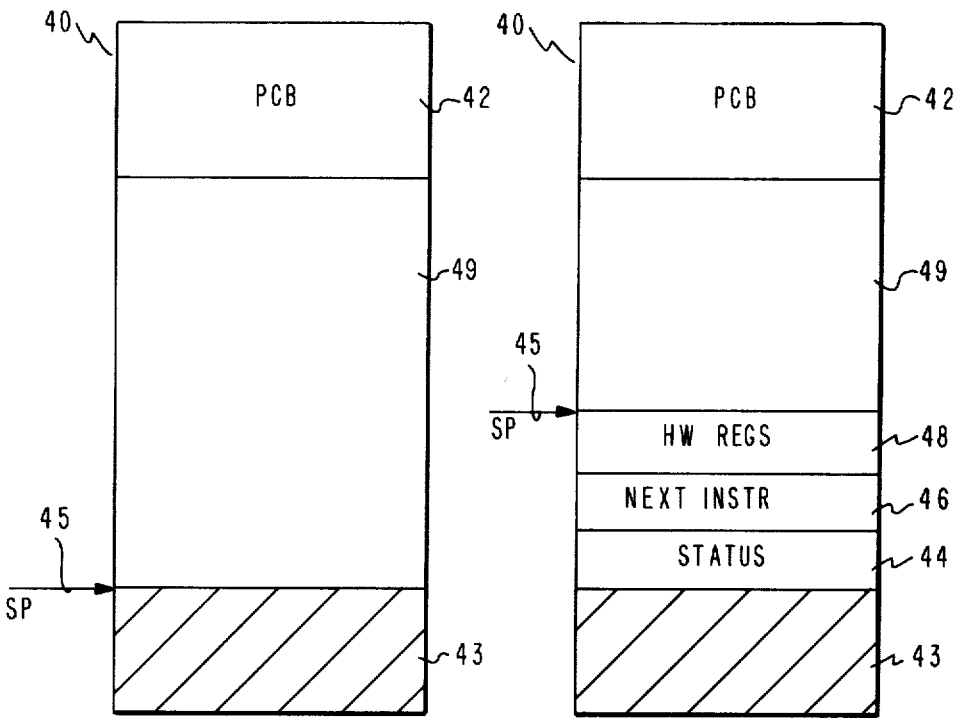
FIG. 3 is a schematic diagram of a stack space before an interrupt occurs.
FIG. 4 shows the stack space of FIG. 2 after an interrupt.

FIG. 3 shows any one of the stack areas 40 from FIG. 2 associated with any given process before an interrupt occurs. A process control block PCB 42 is defined for each process and occupies the first part of each stack which is directly addressable by the stack segment register (SS, a hardware register, when the process is in execution. Process control block 42 contents will be discussed in more detail with reference to FIG. 5. Area 43 of stack 40 represents already used space. The stack pointer register, which is maintained by system hardware, points as indicated by arrow 45 to the first available location in the unused portion 49 of stack 40.

FIG. 4 represents the same stack 40 of FIG. 3, when it has been interrupted during its normal execution. For that reason, process status has been saved in area 44. The address of the next instruction to have been executed is saved in area 46 and the hardware register contents associated with the process are saved in area 48. The unused portion 49 of stack 40 is smaller, and the stack pointer register contents have been decremented to indicate the next available location as indicated by arrow 45.

Figure 5:
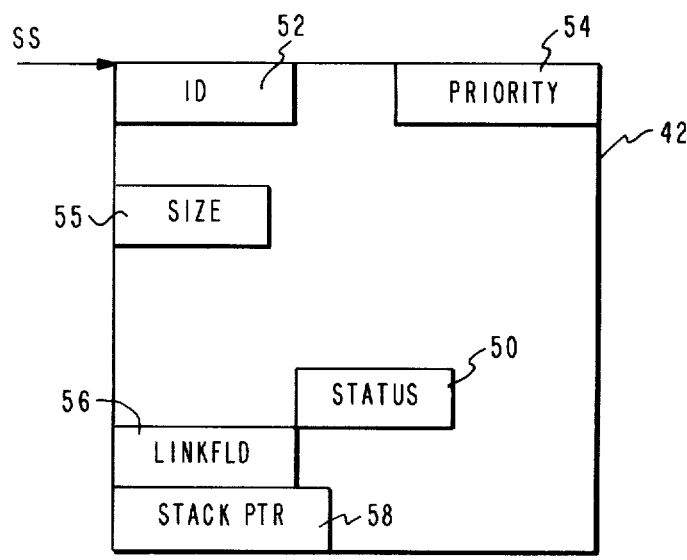
FIG. 5 is a more detailed illustration of the contents of the process control block portion of a stack.

FIG. 5 shows some detail of the contents of a process control block (PCB) 42. Process control block 42 is a central repository of information about a process. It contains the current status of the process, as indicated in area 50. Process control block 42 also serves as a primary focal point for communication with other processes in the system. When a process is running, the stack segment register SS contains the base address of the process control block as well as that of the stack. That is, they are one and the same. Other information contained in the process control block includes its ID represented at 52, priority data at 54, its size at 53, the link field at 56, and stack pointer save area at 58. A PCB 42 always occupies the topmost portion of a stack.

Figure 6:
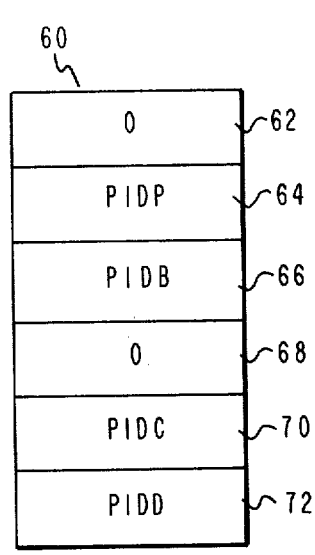
FIG. 6 shows a process address table.

Refer now to FIG. 6. Included in the RAM 22 of FIG. 1 of the system including our invention is a process address table (PAT) schematically shown at 60. The process address table contains addresses for the processes in a logical grouping, which grouping may be all of the processes in a particular system. There are four possible states which a process may have, UNLOADED, WAIT, READY, and RUNNING. When a process is UNLOADED, it is not part of the actual system and no space for the associated PCB and stack have been allocated. A WAITING process is one that has been loaded but is not currently eligible to be dispatched. A READY process is one which has been loaded and is eligible to be dispatched. A RUNNING process is currently the highest priority process in the ready state.

Process address table 60 contains appropriate header information (not shown). Entry space 62 is shown to contain zero. In our system zero indicates that a process is not loaded. In other words, the state of the process is UNLOADED. The next entry 64 contains the address of a process control block for the process having the ID PIDP. Similarly, the address for process PIDB is contained in entry 66. There is no process ID entered at 68. The address of the PCB for process PIDC is indicated at entry 70; that for PIDD at 72. Maintenance of the process address table is a function of the system nucleus.

Figure 7:
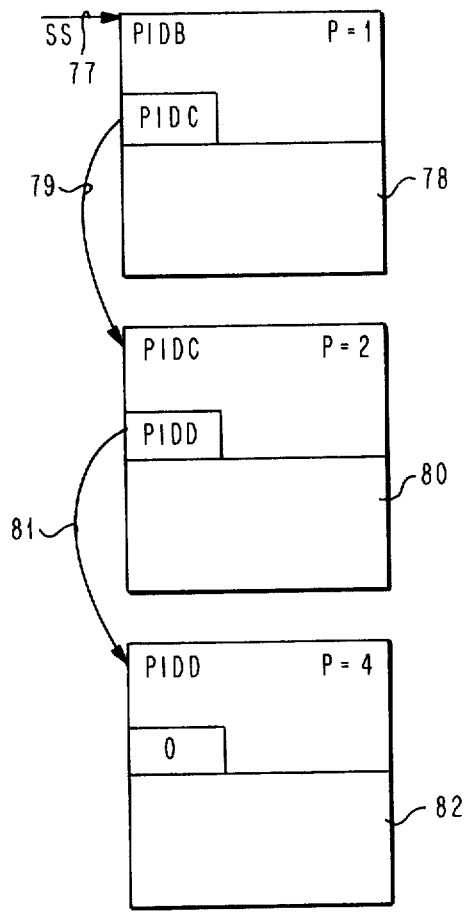
FIG. 7 illustrates the function of the PCB link field when all processes loaded are not on the ready queue.
Figure 7:
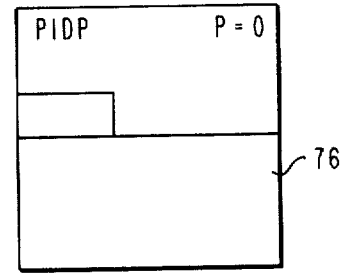
Figures 8, 9:
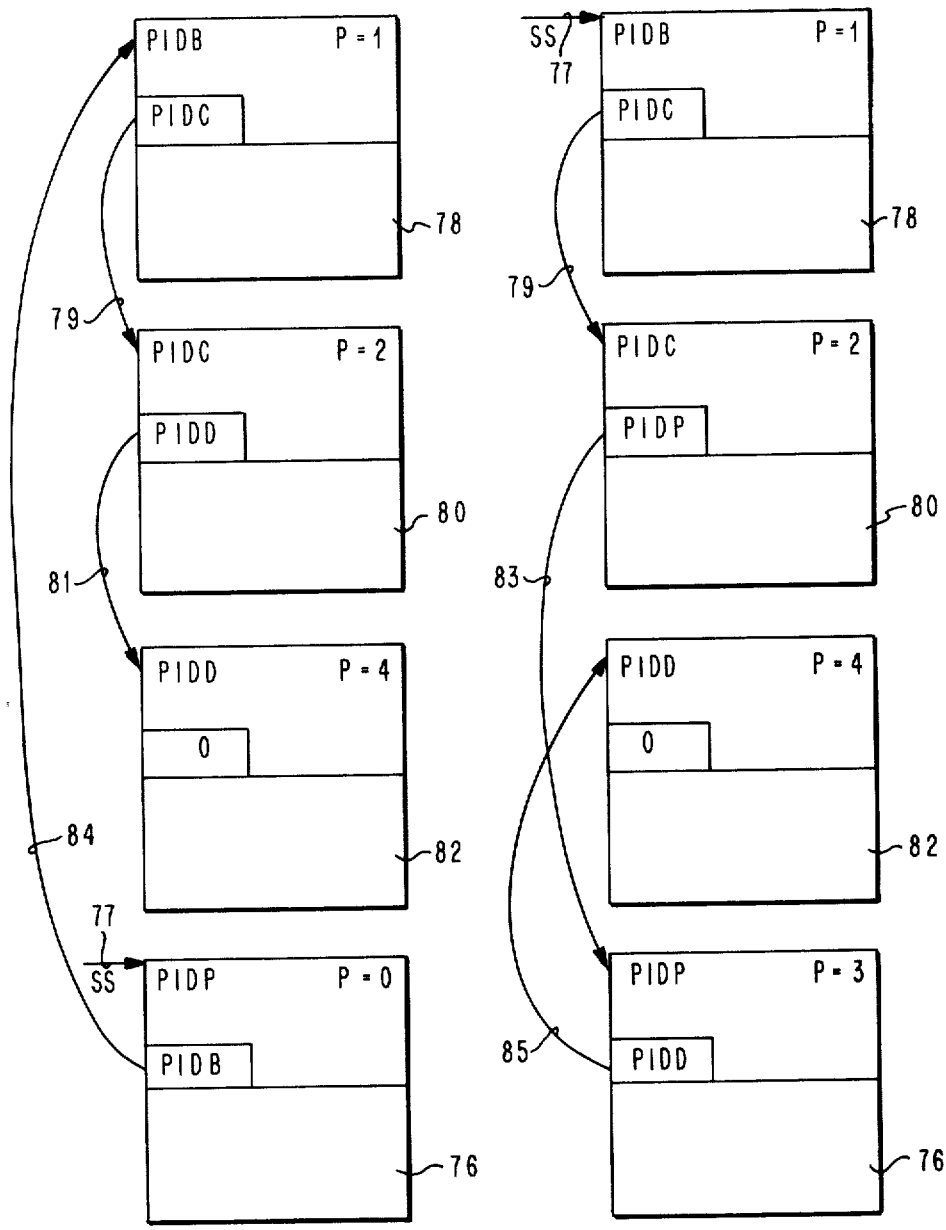
FIG. 8 is an illustration useful in understanding how a process is placed at the start of the ready queue.
FIG. 9 illustrates insertion of a process within the ready queue.

In each of the FIGS. 7 through 9 it will be noted that the hardware maintained stack segment register SS points to the process control block of the highest priority process on the ready list. This is indicated by the SS arrow 77.

FIGS. 7 through 9 illustrate the advantageous reduction in storage space required for a ready queue achieved by means of our distributed ready queue. In FIGS. 7 through 9 the process having the ID PIDP whose address is found in entry 64 in the process address table 60 of FIG. 6 is indicated generally at 76. Likewise, process PIDB at entry 66 in FIG. 6 is indicated at 78. Process PIDC entered at entry 70 in FIG. 6 shown at 80 and finally process PIDD is shown at 82. In all these FIGS. 7 through 9, the ready queue, the priority ordered processes, or tasks ready to take control of the processor is comprised of those processes linked by arrows on the left of the figures.

In FIG. 7, process PIDB at 78 has a priority of one shown by the notation $P=1$, where $P=0$ is defined to be the highest priority. In its link field is the address for process PIDC. As indicated by arrow 79, the link field of process PIDB points directly to the process control block of process PIDC. In FIG. 7 process 80 has a priority $P=2$. Its link field is shown to contain PIDD the address of the process control block for process PIDD. This relation is further illustrated by the arrow 81 connecting the link field of PIDC to PCB of PIDD. Process PIDD has a priority indicated $P=4$, the lowest priority in this group and, therefore, the last entry in the ready queue. Its link field is shown to contain zero, which indicates to the system nucleus that this process is, in fact, the last process in the ready queue.

Process PIDP has a priority P=0, which is higher than any of those shown in FIG. 7. It is not, however, on the ready queue. It may be, for example, WAITING for some event or signal. When whatever is causing process PIDP to be in the WAIT state completes, the process will be placed in the ready queue.

Refer now to FIG. 8. Process PIDP, because of its highest priority, will be placed at the beginning of the queue. This is represented by the arrow 84 connecting the link field of process PIDP which contains the address of the next highest priority process PIDB. Processes PIDB, C, and D are related as they were in FIG. 7. It is the system nucleus, to be discussed again with reference to FIG. 10, which controls the entries in the link fields of the processes. It is to be noted in FIG. 8 in particular that arrow 77 showing where the hardware maintained stack segment register SS is pointing, is now at the start of the PCP for process PIDP. The stack segment register always points to the highest priority entry in the ready queue, i.e., the running process.

Referring now to FIG. 9, the differences between it and FIGS. 7 and 8 are caused by a supposition that the priority of process PIDP has been changed and is now equal to 3, as shown in FIG. 9. This figure shows how the ready queue would be modified by the system nucleus when process PIDP is no longer in the WAIT state. The ready queue is now comprised of the priority ordered entries, PIDB, PIDC, PIDP and PIDD, as indicated by the arrows 79, 83, and 85, connecting link fields to the top of the PCBS whose addresses they contain.

Figure 10:
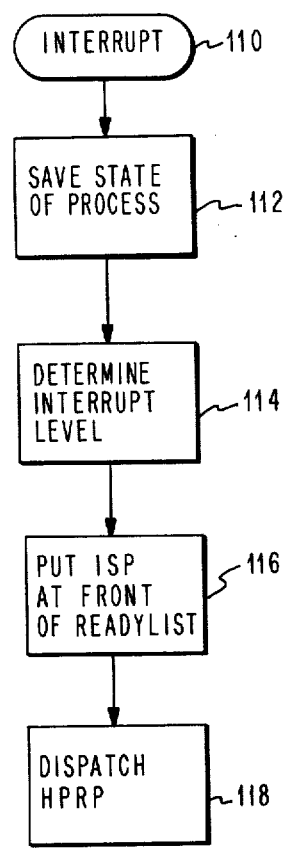
FIG. 10 is a flow chart of functions performed by the system nucleus when an interrupt occurs.

FIG. 10 shows the sequence of functions performed by the system nucleus when an interrupt occurs is represented at 110. The primary function shown in sequence 112 performed in accordance with the present invention is to save the states associated with the interrupted process as illustrated in FIGS. 4 and 5. The hardware registers, the address of the next instruction to be executed, and the status of that particular process are stored in the stack associated with that process. Stack pointer contents are placed in its field in the PCB associated with that process. In the system in which our invention is embodied one interrupt handling process exists for each interrupt level. The system nucleus must, as indicated at sequence 114, determine the interrupt level and at 116 place the appropriate interrupt service process at the front of the ready list or queue. This update of the ready list is illustrated and discussed at FIG. 8. The interrupt service process, which is by definition the highest priority ready process, is then dispatched at sequence 118.

As discussed with reference to FIG. 9, when a WAITING process is made READY, it is inserted by the system nucleus into the ready list according to its priority. Once the newly readied process has been inserted, the highest priority ready process is dispatched.

Figure 11:
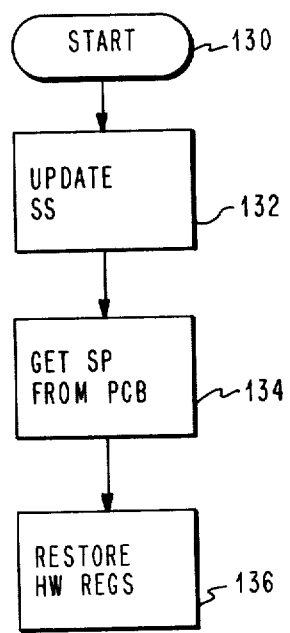
FIG. 11 shows the elements of the sequence represented at step 118 in FIG. 10.

FIG. 11 shows in more detail the steps represented at function sequence 118 in FIG. 10. When the dispatcher begins at 130 to give the highest priority ready process control of the processor, it must first update the contents of the stack segment register to point to the stack of the highest priority ready process. This is represented at 132. At sequence 134, the dispatcher loads the system stack pointer register with the contents of the stack pointer field in the PCB of that process (58, FIG. 5). This step, represented at 136, includes and concludes with the restoration of the hardware flags and the instruction pointer. This information was kept in the stack as represented at step 112 in FIG. 10 and graphically illustrated in FIG. 4. At this point, the highest priority ready process is running.

Certain terms are used and design choices made because the exemplary embodiment was implemented on a particular microprocessor. Obviously, modifications resulting from the use of another processor would be made without departing from the scope of the invention as claimed.

We claim:

1. A method of efficiently handling priority ordered, interrupt driven processor allocation in a multiprocess environment including the step of:
   defining an independently indentified and addressable stack storage area for each process to be performed, each stack so defined having a process control block, the beginning of which is coincident with the beginning of the stack storage area.

2. The method of claim 1 including the further step of defining in each process control block a priority field for storing the priority level of the process.

3. The method of claim 2 including the further step of defining in each process control block a field for holding the address of the process control block of the next process to be performed.

4. The method of claim 3 including the further step of determining the next process to be performed as a function of its priority.

5. A system for handling processor interrupts and dispatching a plurality of processes for execution by the processor in an interrupt driven environment including:
   means for managing independently addressable stack storage areas for each process to be performed;
   means responsive to said means for managing for defining a control block physically associated with each stack storage area; and
   means associated with the control blocks so defined for connecting the control blocks to form a distributed list of processes ready for access to the processor.

6. The system of claim 5 wherein the means for connecting the control blocks includes:
   means for defining and maintaining a priority field in each control block; and
   means for defining and changing a link field.

* * * * *